Sept. 13, 1966 R. L. CRANE 3,272,149

INERTIA COMPENSATING CONVEYOR

Filed May 14, 1964 3 Sheets-Sheet 1

INVENTOR.
ROBERT L. CRANE
BY
Moore, White & Reed
ATTORNEYS

INVENTOR.
ROBERT L. CRANE
BY
Moore, White & Bird
ATTORNEYS

INVENTOR.
ROBERT L. CRANE
BY Moore, White & Burd
ATTORNEYS

United States Patent Office 3,272,149

Patented Sept. 13, 1966

1

3,272,149

INERTIA COMPENSATING CONVEYOR

Robert L. Crane, Hopkins, Minn., assignor, by mesne assignments, to Eastman Kodak Company Filed May 14, 1964, Ser. No. 367,344
13 Claims. (Cl. 104—173)

The present invention is a product conveyor of intermittent movement and having a product platform on which an unsecured product may be transported with no tendency to change its position relative to the product platform due to acceleration or deceleration of the platform.

This result is accomplished by generating forces countering the inertia of the product. In the specific example disclosed herein, gravitational force vectors are created by use of a mechanically actuatable means comprising a sliding inertial massive member, a driven sliding member, a resilient coupling between them, an oscillating product platform secured to one of the sliding and massive members, in this example the inertial massive member, and a link interconnecting the oscillating product platform to the one of the resiliently coupled members to which the platform is not secured. When the driven sliding member accelerates, the massive member lags altering the gap between the sliding member and the sliding massive member because of the inertia of the massive member and the resilient coupling interposed between the mass and the sliding member. Changing the gap between the driven sliding member and the massive sliding member causes the link, which is pivotally secured between the driven sliding member and crank secured to the oscillating product platform, to tilt the product platform. Tilting the product platform subjects the product thereon to a gravitational force component. The gravitational force component offsets the acceleration force to which the product is subjected. For any given rate of acceleration, weight of product and coefficient of friction the angle of the platform will remain constant. As the velocity of the inertial massive member approaches that of the driven member, as for example, at the transition between acceleration and deceleration, the resilient coupling between the sliding member and the sliding massive member urges these members to their original separation, whereupon the linkage causes the product platform to return to a level attitude. When the conveyor is stopped the above described process is reversed to balance the deceleration force with a gravitational force component or vector.

Accordingly, the principal object of this invention is to provide an improved product conveyor of intermittent movement.

It is another object of this invention to provide an intermittent conveyor for products in which accelerative and decelerative forces otherwise tending to move the product relative to the conveyor are offset by equal and opposite forces created by a mechanically actuatable means.

It is a further object of this invention to provide an intermittent conveyor having an oscillating product platform which is tilted to a predetermined angle proportional to the acceleration or deceleration for the purpose of subjecting the unsecured product carried thereon to gravitational force components which offset and balance the adverse accelerative and decelerative forces.

Another object of this invention is to provide a means for tilting the product carrier to a predetermined angle proportional to the rate of acceleration or deceleration by the use of a driven sliding member, an inertial mass with resilient means connecting, them, an oscillatable product platform secured to said inertial mass, and a link whose ends are secured to the sliding member and the product platfrom assembly respectively.

2

It is another object of this invention to provide an intermittent movement conveyor in which a driven member is resiliently coupled to an inertial mass and the inertia of the mass causes it to lag and override the driven member to the extent permitted by the resilient coupling to provide movement resulting in action that compensates for acceleration and deceleration forces applied to conveyed objects during starting and stopping.

A further object of this invention is to eliminate problems arising from the inertia of the unsecured product resting on a conveyor or product platform and associated with starting and stopping the product platform carrying a product which is not fixed thereon.

A still further object of this invention is to provide a product conveyor of intermittent motion upon which the unsecured product remains accurately positioned without being fixed to the conveyor during its transportation.

A yet still further object of this invention is to provide a product conveyor which may be adapted to transporting items of differing weights, size and shape.

It is a further object of this invention to provide a conveyor for propelling objects through a coating film in the manner calculated to produce the best coating.

Yet another object of this invention is to provide a conveyor for moving objects through a coating film in which the platform supporting the object is tilted at an angle of about 45°.

Other objects, features and advantages of the present invention will be readily apparent from the following detailed description of certain preferred embodiments thereof taken in conjunction with the accompanying drawings in which.

Figure 1:
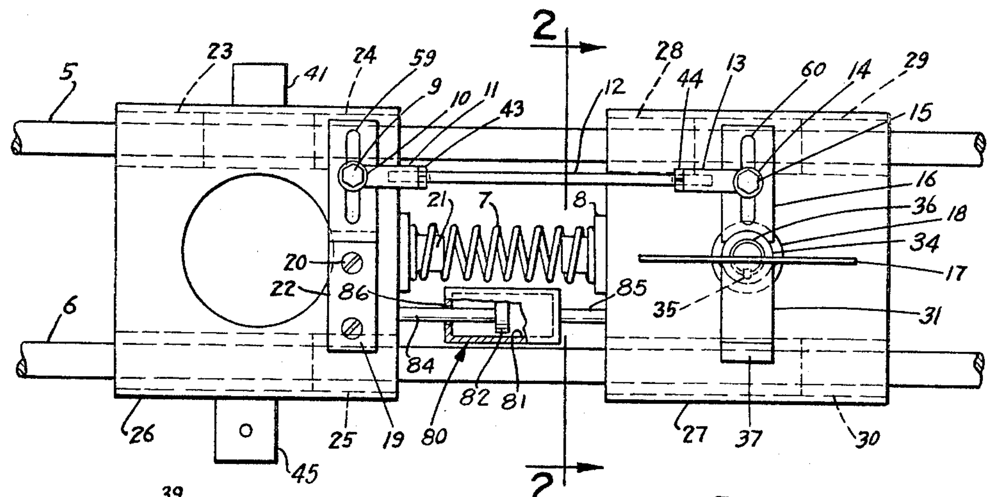
FIGURE 1 is a side elevation of the conveyor either in a rest or constant velocity configuration.
Figure 2:
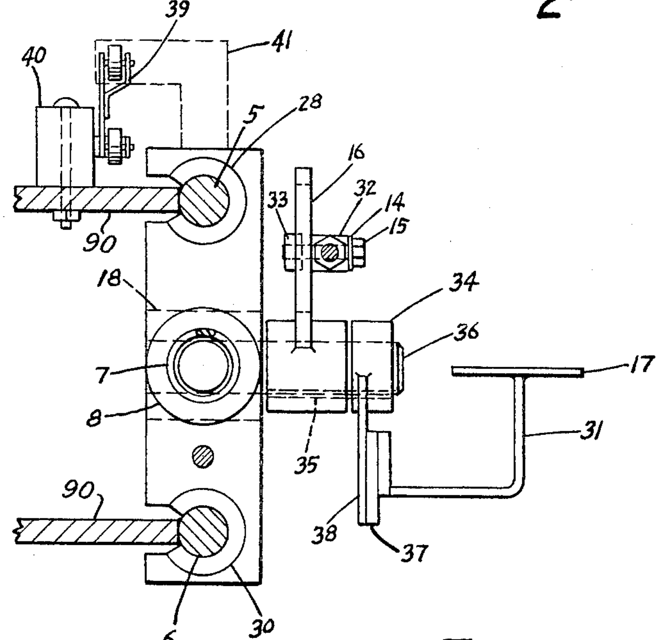
FIGURE 2 is an enlarged section taken along the line and in the direction of the arrows 2—2.
Figure 3:
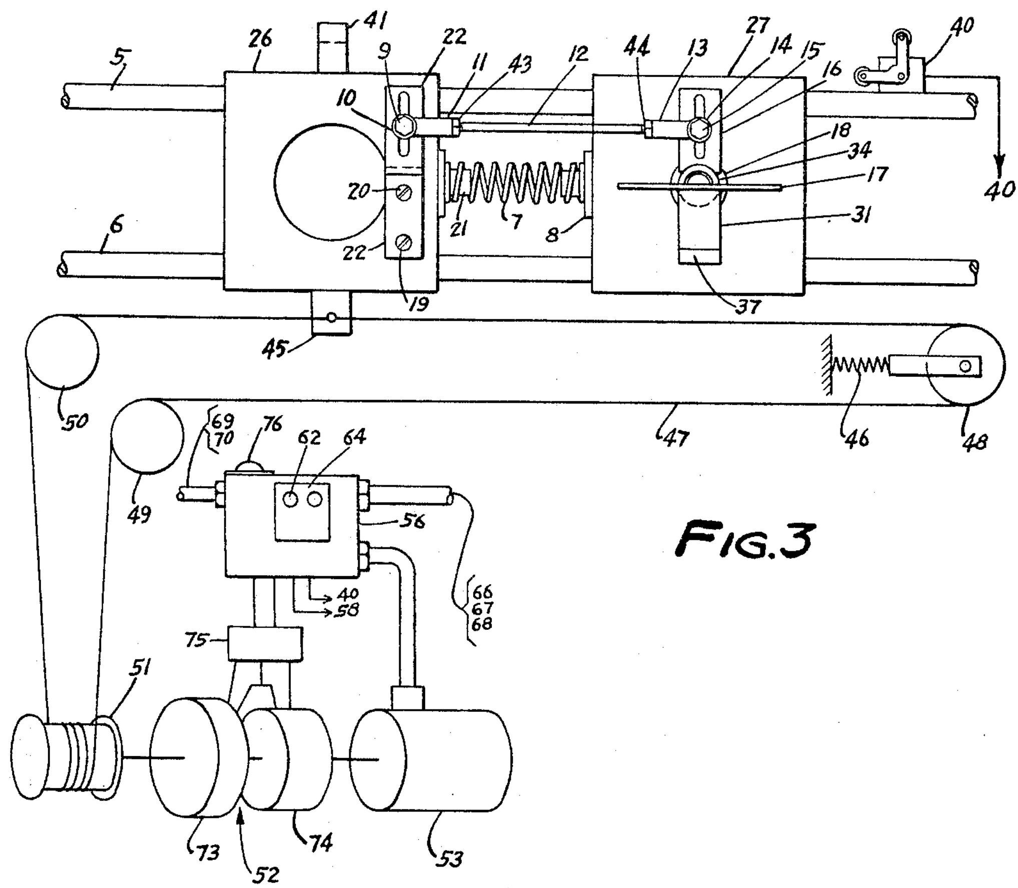
FIGURE 3 is a schematic drawing of the drive mechanism in combination with a side elevation of the conveyor drawn to a smaller scale than FIGURE 1 but otherwise similar to that figure.
Figure 4:
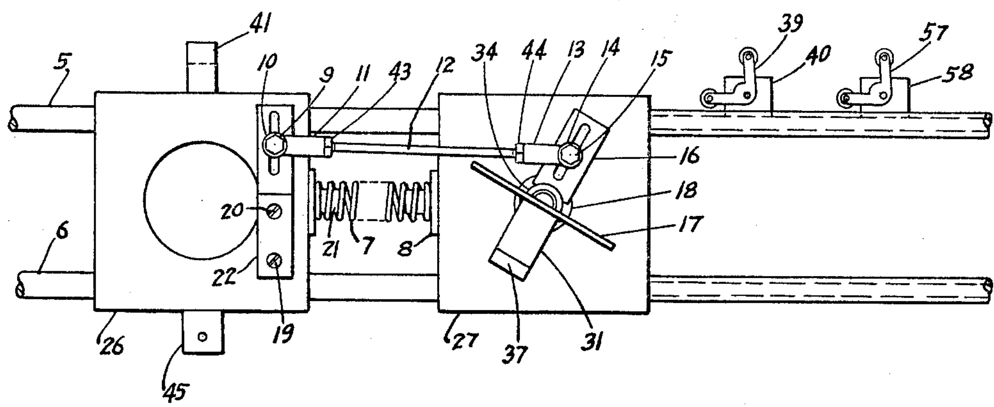
FIGURE 4 is a side elevation of the conveyor either in a state of acceleration to the right or deceleration to the left and drawn to the same scale as FIGURE 3.

In FIGURES 1 through 4, 26 is a driven sliding member which is slidably mounted on suitable spaced tracks or guide shafts 5 and 6 using any acceptable bearing means, for example, split ball bushings 23, 24 and 25. A sliding massive member 27 is similarly slidably mounted on guide shafts 5 and 6 with suitable bearing means such as the split ball bushings 28, 29, and 30, forming its contact points with the guide shafts 5 and 6. As seen in FIGURE 2, the guide shafts 5 and 6 are supported by a frame or other like support member 90. Sliding massive member 27 is spaced from driven sliding member 26 and connected to it by a suitable resilient means such as spring 7 whereby the massive member is driven in the same direction as the driven member but in a delayed reaction relationship. Spring 7 is centered and secured to sliding member 26 on the spring guide post 21 and similarly secured to the mass 27 by the spring guide post 8.

A damper 80 may be interposed between the massive member 27 and the driven member 26 to remove undesirable, repetitive overtravel or bunting as it is called. While such a dampener is desirable, it is not essential. As shown the dampener consists of a cylinder 81 that loosely embraces a piston 82. A shaft or support 84 secures the piston 82 to driven member 26 and a similar support 85 secures cylinder 81 to the massive sliding member 27. The piston and cylinder are aligned and there is clearance around support 84 as shown at 86 to allow air to escape from and enter the cylinder. The dampener employed is a commercially available unit and may be substituted for by any suitable form of dampener.

The product carrier comprises a product platform 17 mounted to oscillate on one of the sliding members, preferably the massive member 27, on an axis perpendicular to the direction of travel. An exemplary method of accomplishing this is to have the product carrier 17 secured to the product platform bracket 31 which is, in turn, removably secured to the platform crank arm 38 by any appropriate means, an example of which is the use of a magnet 37 here shown illustratively as a permanent type. The permanent magnet 37 permits the platform 17 to be adjusted upward or downward so that the center of gravity of the product is at the same level as the center of shaft 36. The use of the magnet 37 makes the product platform 17 readily removable and thus a larger, or smaller platform may be easily substituted. The platform crank arm is mounted on shaft 36 which is rotatably secured to mass 27 in a manner suitably represented by the bearing 18. Connecting rod crank arm 16 is also mounted on shaft 36 being fixed in relation to the platform crank arm 38 by means of a key 35. The connecting rod mounting bracket 22 is rigidly secured to sliding member 26 by any appropriate means, an example of which is the use of bolts 19 and 20. A connecting rod or link assembly 12 is connected between arm 16 and bracket 22 by suitable adjusting means such as the slot 59 located on the connecting rod mounting bracket 22 and slot 60 located on the slotted connecting rod crank arm 16.

Said slots 59 and 60 are provided so that maximum angle of tilting of the product platform 17 may be varied so as to allow a wide variety of product weights to be handled by the conveyor. The angle appropriate for a given object at a given acceleration may be calculated by knowing that the accelerating force must equal the product of the tangent of the angle multiplied by the weight of the object. By altering acceleraion speeds, therefore, some variation in the angle of tilt is possible. It has been discovered in using the present conveyor to convey objects through coating films, for example, that an angle of about 45° is most desirable. This angle may be achieved by altering the speed of acceleration to match the weight of the object to achieve the desired angle. The connecting rod 12 is also adjustable in length. An exemplary way of achieving this adjustment of length is by controlling the depth to which the connecting link center portion of the assembly 12 is screwed into the connecting link bearing sockets 11 and 13. The adjustment once made may be held by any of several locking devices such as the use of lock nuts 43 and 44.

The connecting rod or link assembly 12 is attached to sliding member 26 through a mounting bracket 22 in such a manner that the end of the connecting rod assembly 12 is rotatable as well as being vertically adjustable. One method of accomplishing this end is to fasten the connecting rod socket 11 by means of a bolt 9 passing through the washer 10, the connecting rod socket 11 and the slot 59 in the connecting rod bracket 22 and said bolt 9 being held in place by a shoulder nut which fits in the slot 59 allowing vertical adjustment in said slot 59. The opposing end of connecting rod 12 may be similarly held in place by bolt 15 passing through washer 14, bearing socket 13, slot 60 and held in place by shoulder nut 33. Loosening nut 33 allows sliding adjustment of the bolt 15 in slot 60 which provides adjustment of socket end 13 along crank arm 16.

Any suitable means may be used to drive and stop the sliding member 26, an example of which is the use of a cable 47. This cable is secured to a drive bracket 45 of member 26 and from there extends around sheaves 48, 49 and 50, one of which may be under spring tension as from spring 46 to keep cable 47 taut, and finally several times around a cable drum 51.

Figure 5:
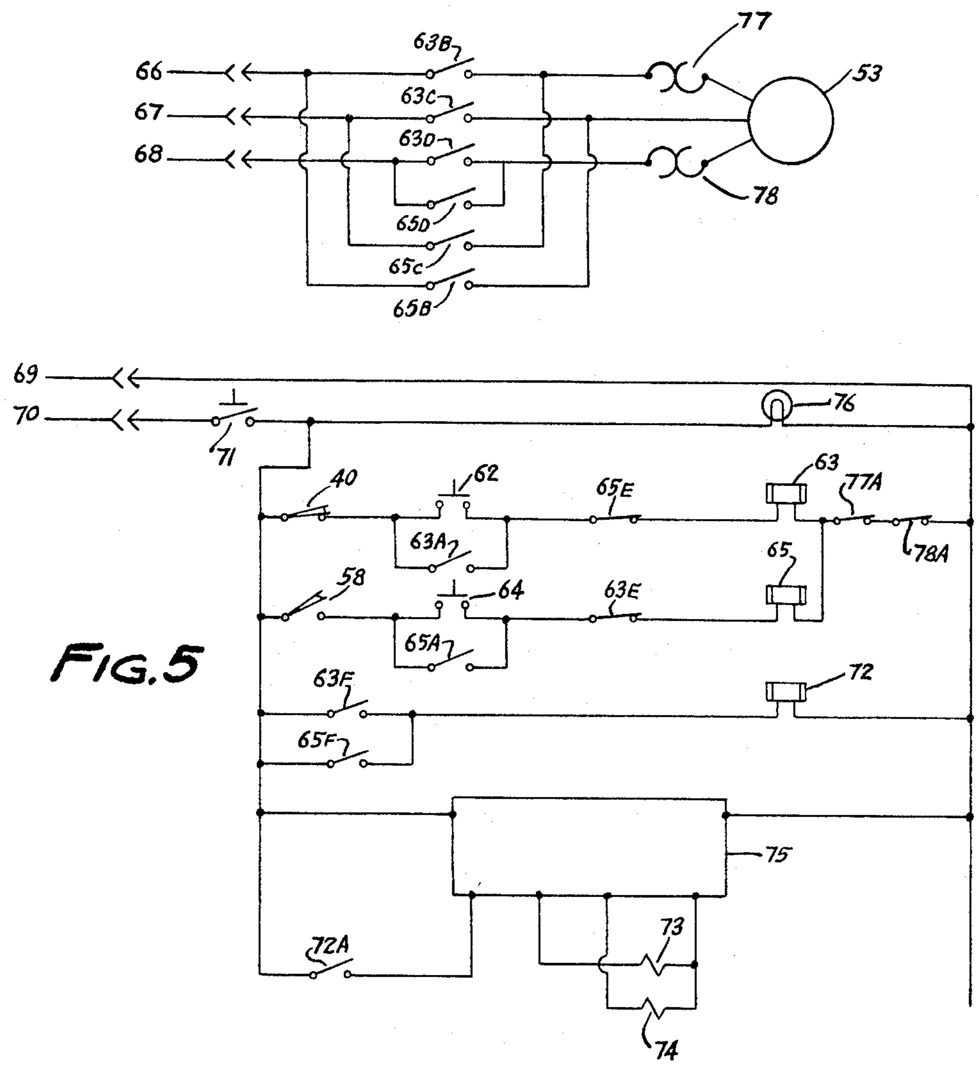
FIGURE 5 is a schematic wiring diagram of the drive motor and controls for the brake and clutch.

A motor 53 drives the drum 51 via a magnetic brake and clutch assembly designated generally as 52, all of which are purchased units and hence not described herein in further detail. The motor 53 and magnetic brake and clutch assembly 52 are controlled by an appropriate electrical system as shown in FIGURE 5 in which 69 and 70 are power leads to the control system. The input power is turned on or off by a master switch 71, which when closed causes current to light the pilot light 76. Assuming a toggle type limit switch 40 to be closed as seen in FIGURE 5, the system is in such a configuration that forward motion of the conveyor will be achieved by pushing button 62. When push button switch 62 is pushed momentarily, current is passed through the relay coil 63 closing relay points 63A, 63B, 63C, 63D and 63F, which are normally open, and opening relay points 63E which are normally closed. Points 63A are connected in parallel around switch 62 to continue to energize coil 63 after switch 62 is released.

When the relay points 63B, 63C and 63D are closed, the motor 53 receives power from leads 66, 67 and 68 and begins to run in the forward direction.

The time delay relay 72 is also energized when switch 62 is closed and points 63F are closed. After its predetermined delay, to allow the motor 53 to attain operating speed, the time delay relay 72 closes the relay points 72A. Closing these points applies current to the rectifier 75 in a manner energizing the clutch 74 and releasing brake 73. When the clutch 74 is energized, it engages transmitting power from the motor 53 to the drum 51. After the conveyor has traversed about one-half its route, the limit switch actuating bracket 41, which is rigidly secured to the sliding member 26, opens the switch 40 thus breaking the circuit to relay coil 63. The relay 63 is thus de-energized causing points 63A, 63B, 63C, 63D and 63F to open and points 63E to close.

The opening of points 63B, 63C and 63D cuts off the current to the motor 53. Opening the points 63A cuts off current to the clutch 74 and applies power to the brake 73. The brake 73 and clutch 74, in the preferred embodiment, come as a unit 52 which is adjustable in rate of application.

When the conveyor has traveled a short distance beyond the circuit switch 40 the limit switch contact bracket 41, which is rigidly secured to the sliding member 26, closes limit switch 58, which was previously standing open as seen in FIGURE 5.

With limit switch 58 closed, the circuit is in such a configuration that closing switch 64 will cause the conveyor to return to its starting position. Closing switch 64 energizes the relay 65, closing the normally open points 65A, 65B, 65C, 65D and 65F and opening the normally closed points 65E.

When the points 65B, 65C and 65D are closed, the motor receives power from leads 66, 67 and 68, and begins to run in the reversed direction.

The time delay relay 72 is energized when switch 64 is closed and points 65F become closed. After its predetermined delay, to allow the motor to attain operating speed, the time delay relay 72 closes the relay points 72A. Closing these points applies current to the rectifier 75 and energizes the clutch 74 and de-energizes the brake 73. When the clutch 74 is energized it engages transmitting power from the motor 53 to the drum 51. When the conveyor has traversed about one-half of its return route the limit switch actuating bracket 41 which is rigidly secured to the sliding member 26 opens the switch 58. The relay 65 is thereby de-energized causing points 65A, 65B, 65C, 65D and 65F to open and points 65E to close. The opening of points 65B, 65C and 65D cuts off the current to the motor 53. Opening the points 65A cuts off the current to the clutch 74 and causes the brake 73 to be applied.

When the conveyor has traveled a short distance beyond the limit switch 58, on its return trip, the limit switch contact bracket 41, which is rigidly secured to sliding member 26, closes the limit switch 40 thus returning the system to the condition shown in FIGURE 5 ready for another cycle.

The motor is protected against overloading by the overload heaters 77 and 78 which, when overheated, open the control circuit points 77A and 78A. Opening either point 77A or 78A breaks the circuit for coils 63 and 65 thus opening points 63A–D and F and closing 63E or opening points 65A–D and F and closing 65E. The opening of points 63B, 63C and 63D or 65B, 65C and 65D causes the current to the motor 53 to stop. Opening the points 63F or 65F stops the current to the clutch relay 72 opening points 72A. As points 72A open, the current pattern through recifier 75 alters releasing the clutch 74 from engagement. As the clutch 74 is disengaged the brake 73 is applied. Thus, when an overload occurs the conveyor is brought to a stop.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A product conveyor on which products are transported from one point to another comprising, at least a first and second movable member adapted to travel in similar paths, means for driving said first and second movable members so that they accelerate and decelerate differently from each other whereby the distance between them varies in proportion to their relative rates of acceleration or deceleration, a product platform means movably mounted on one of said first and second movable members, and linkage means operatively attached between said product platform means and the other of said first and second movable members for moving said product platform means as the distance between said first and second movable members varies whereby a reaction force is applied to any products resting on said product platform means which opposes any force tending to move the products relative to said product platform means.

2. A product conveyor according to claim 1 wherein said reaction force applied to said products is a gravitational force component generated by the tilting of said product platform means.

3. A product conveyor according to claim 1 wherein said product platform means is tilted to an angle the tangent of which when multiplied by the weight of the products equals the force of acceleration or deceleration.

4. A product conveyor on which products are transported from one location to another comprising: two movable members, the first of said movable members being directly driven, the second of said movable members being massive; resilient means and vibration damping means interposed between and secured to said movable members to urge said massive movable member into delayed motion upon said driven movable member being driven, and to stop said massive members' motion in delayed reaction upon said driven members' stopping; a product platform for carrying the products to be coveyed, said product platform being rotatably secured to one of said movable members for movement about an axis that is substantially perpendicular to both the direction in which the product conveyor is being moved and the earth's surface; and a link one end of which is pivotably secured to the other one of said movable members; the other end of said link being pivotally secured to said product platform.

5. A product conveyor according to claim 4 further characterized by said two movable members being slidably secured upon at least one guide rail disposed along a path parallel to the path to be traveled by said product.

6. A product conveyor comprising, a frame, two spaced members movably secured to said frame to travel in similar paths, means for driving said two spaced members to accelerate and decelerate differently from each other whereby the space between them varies in proportion to their relative rates of acceleration or deceleration, a product platform pivotally secured to one of said spaced members, and a link pivotally secured to said product platform and the other of said two spaced members for tilting said platform as the space between said two spaced members varies so that a reaction force is applied to any article resting on said product platform which opposes any force tending to move the article relative to the surface of said platform.

7. The structure of claim 6 in which said link includes means for securing it to said product platform at different distances from its axis of pivoting.

8. An intermittent conveyor in which a product platform accelerates from an at rest to a conveying speed and decelerates to an at rest position, a frame, two spaced members movably secured to said frame, means secured to said frame for driving one of said members, means for driving the other of said members in delayed reaction relative to said one member but in the same direction, a product platform rotatably secured to one of said members for movement about an axis that is substantially perpendicular to both the direction in which the product conveyor is being moved and the earth's surface, and a link interconnecting said product platform and the other of said members for tilting said platform as the space between said two spaced members varies so that a reaction force is applied to any article resting on said product platform which opposes any force tending to move the article relative to the surface of said platform.

9. A product conveyor of intermittent operation on which unsecured products are held in position on said conveyor during acceleration and deceleration comprising, a frame, a mechanically actuatable means secured to said frame for keeping products stationary on said conveyor during acceleration and deceleration, means for automatically actuating said mechanically actuatable means including, an inertial mass slidably secured to said frame, a sliding member secured to said frame, a resilient means coupling said sliding member to said inertial mass, said mechanically actuatable means being on one of said sliding member and inertial mass, and a link coupling the other of said sliding member and inertial mass to said mechanically actuatable means for actuating said mechanically actuatable means during acceleration and deceleration of said conveyor, and means accelerating and decelerating said conveyor through the movement of said sliding member.

10. A product conveyor according to claim 9 wherein said mechanically actuatable means is a product platform that is secured to said other member and is driven in delayed reaction.

11. A product conveyor of intermittent operation on which unsecured products are held in position on said conveyor during acceleration and deceleration comprising, a frame, a mechanically actuatable means secured to said frame for keeping products stationary on said conveyor during acceleration and deceleration, means for generating the force to actuate said mechanically actuatable means comprising two spaced members movably secured to said frame, means for accelerating and decelerating said two spaced members, means for causing a variation in acceleration and deceleration as between said two spaced members, said mechanically actuatable means being secured to one of said two spaced members, and a link interconnected between said mechanically actuatable means and the other of said two spaced members for actuating said mechanically actuatable means during acceleration and deceleration of said conveyor.

12. A product conveyor comprising:

A. a frame;

B. at least one guide rail rigidly secured to said frame and disposed along a path paralleling the proposed route of the product to be conveyed;

C. a sliding member slidably secured to said guide rail;

D. means for driving said sliding member along said guide rail comprising (1) a cable both ends of which are fixed to said sliding member, (2) a series of sheaves rotatably secured to said frame for receiving said cable, and (3) resilient means secured to said frame and at least one of said sheaves urging it in such a direction as to keep said cable under tension;

(4) a cable drum rotatably secured to said frame for receiving said cable;

(5) a motor rigidly secured to said frame;

(6) a clutch secured to said frame for inter-connecting said motor and cable drum so that the torque of said motor can be transmitted to said cable drum thereby driving said sliding member along said guide rail, and (7) brake means for decelerating and stopping said sliding member;

E. a massive member slidably mounted on said guide rail, (1) said massive member having rotatably secured thereto a support means that is adapted to be tilted about an axis perpendicular to the direction in which said massive member is moved;

F. a product carrier supported by said support means for carrying the articles to be moved by the conveyor;

G. link means connected at one end to said sliding member and at the other end to support means so that said product carrier is tilted toward said sliding member when said massive member and said sliding member are moved away from one another, and is tilted away from said sliding member when said massive member and said sliding member are moved together, and H. vibration damping means secured to said massive member and to said sliding member for retarding the movement of said members in relationship to one another along said guide rail.

13. A product conveyor comprising:

A. at least one guide means;

B. a movable member movably secured to said guide means;

C. means for driving said movable member along said guide means;

D. a massive member movably secured upon said guide means;

E. resilient means interposed between said movable member and said massive member and interconnecting them for movement along said guide means;

F. a product carrier comprising, (1) a bracket, (2) a product platform secured to said bracket for holding the articles to be carried by the conveyor, and (3) pivot means for rotatably securing said bracket on said massive member; and G. link means pivotably secured to said movable member and product carrier so that acceleration of said movable member in relationship to said massive member will result in said product platform being tilted toward the direction of acceleration while deceleration of said movable member in relationship to said massive member will cause said product platform to tilt toward the direction of deceleration along said guide means.

No references cited.

ARTHUR L. LA POINT, *Primary Examiner.*

F. W. MONAGHAN, D. E. HOFFMAN, *Assistant Examiners.*